United States Patent [19]

Maurer

[11] 4,142,997
[45] Mar. 6, 1979

[54] PERFUME COMPOSITIONS CONTAINING TRICYCLIC COMPOUNDS

[75] Inventor: Bruno Maurer, Collonge-Bellerive, Switzerland

[73] Assignee: Firmenich S.A., Geneve, Switzerland

[21] Appl. No.: 751,542

[22] Filed: Dec. 16, 1976

Related U.S. Application Data

[63] Continuation of Ser. No. 570,827, Apr. 23, 1975, abandoned.

[30] Foreign Application Priority Data

Oct. 10, 1972 [CH] Switzerland ............... 14783/72

[51] Int. Cl.² ............... C11B 9/00; C07C 35/22; C07C 49/26; C07C 69/14
[52] U.S. Cl. ............... 252/522; 560/117; 260/398; 562/499; 260/586 R; 426/538; 252/89 R; 252/108; 252/305; 131/17 R
[58] Field of Search ............... 252/522

[56] References Cited

U.S. PATENT DOCUMENTS

| 3,963,782 | 6/1976 | Nagakura et al. ............... 252/522 |
| 3,996,169 | 12/1976 | Light et al. ............... 252/522 |

OTHER PUBLICATIONS

D. C. Umarani et al., Sep., Oct. 1969, pp. 307–315, Perfume & Essential Oil Records, 60.

Fusao Kido et al., Tetrahedron Letters, No. 29, pp. 2815–2820, 1967.

D. C. Umarani et al., The Flavor Industry, I, 623–624, 1970.

G. Buchi et al., J. Am. Chem. Soc., 83, 927–938, 1961.

*Primary Examiner*—Veronica O'Keefe
*Attorney, Agent, or Firm*—Pennie & Edmonds

[57] ABSTRACT

Use of tricyclic compounds, some of which are new, as perfuming and/or flavoring ingredients in the manufacture of perfumes and perfumed products and/or in the preparation of artificial flavors for foodstuffs, animal feeds, beverages, pharmaceutical preparations and tobacco products.

Process for the preparation of said tricyclic compounds.

2 Claims, No Drawings

PERFUME COMPOSITIONS CONTAINING TRICYCLIC COMPOUNDS

This is a continuation, of application Ser. No. 570,827, filed Apr. 23, 1975, abandoned.

SUMMARY OF THE INVENTION

The invention relates to the use as perfuming and/or flavouring ingredients of tricyclic compounds of formula

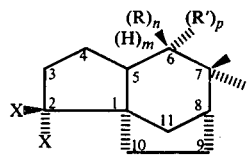

containing a single or a double bond in the position indicated by the dotted line at position 5 and wherein the indexes $m$, $n$ and $p$ represent the integers zero or 1, the symbols X represent when taken together an oxygen atom, or when taken separately one of them represents an acyl, a hydroxyl, an O-acyl, a $CH_2OH$, a $CH_2O$-acyl or a COO-alkyl group and the other represents a hydrogen atom, and wherein:

(i) the symbol R represents a lower alkyl group when both $m$ and $p$ are identical and equal to zero and $n$ is 1; or (ii) the symbol R represents a lower alkylidene group when $m$ and $n$ are identical and equal to 1 and $p$ is zero; or (iii) one of the symbols R and R' represents a lower alkyl group and the other is a hydrogen atom when each of the indexes $m$, $n$ and $p$ is equal to 1.

The invention also relates to new tricyclic compounds of formula

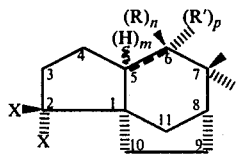

containing a single or a double bond in the position indicated by the dotted line at position 5 and wherein the indexes $m$, $n$ and $p$ represent the integers zero or 1, and wherein (i) the symbol R represents a lower alkyl group when the indexes $m$ and $p$ are identical and equal to zero and $n$ is 1, and wherein the symbols X represent when taken together an oxygen atom, or when taken separately one of them represents a hydroxyl, an O-acyl, an acyl, a COOH or a $CH_2O$-acyl group and the other represents a hydrogen atom; or (ii) the symbol R represents a lower alkylidene group when the indexes $m$ and $n$ are identical and equal to 1 and $p$ is zero and wherein one of the symbols X represents an acyl, an O-acyl or a $CH_2O$-acyl group and the other is a hydrogen atom; or (iii) one of the symbols R and R' represents a lower alkyl group and the other is a hydrogen atom when all the indexes $m$, $n$ and $p$ are equal to 1 and wherein one of the symbols X represents a $CH_2O$-acyl group and the other is a hydrogen atom.

The invention further relates to a process for the preparation of tricyclic compounds of formula

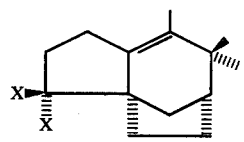

wherein the symbols X represent when taken together an oxygen atom, or when taken separately one of them represents a hydroxyl, an O-acyl, a COOH, a $CH_2OH$ or a $CH_2O$-acyl group and the other represents a hydrogen atom, which comprises treating a compound of formula

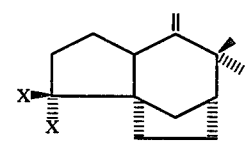

wherein the symbols X have the same meaning as indicated above, by means of an acidic isomerization agent.

The invention finally relates to a process for the preparation of the tricyclic compound of formula

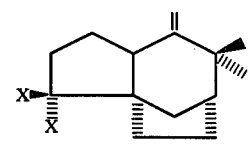

wherein the symbols X taken together represent an oxygen atom, which comprises:

(A) decarboxylating under oxidative conditions the compound of formula III wherein one of the symbols X represents a COOH group and the other represents a hydrogen atom to afford a compound of formula

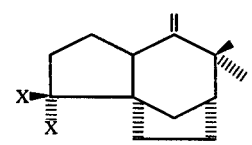

wherein one of the symbols X represents an O-acyl group and the other represents a hydrogen atom, hydrolizing or reducing the said ester and finally oxidizing the thus obtained hydroxy derivative; or (B) reducing the compound of formula III wherein one of the symbols X represents a COOH group and the other represents a hydrogen atom to afford the compound of formula III wherein one of the symbols X represents a $CH_2OH$ group and the other represents a hydrogen atom, acylating the said alcohol, pyrolizing the thus obtained ester to afford the compound of formula

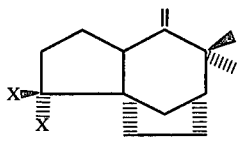

wherein the symbols X taken together represent a methylene group and finally oxidizing the thus obtained compound.

BACKGROUND OF THE INVENTION

Among the tricyclic compounds which can be prepared by the process of the invention, two of them, more precisely 7,7-dimethyl-6-methylene-tricyclo[6.2.1.0$^{1,5}$] undecan-2-one and 7,7-dimethyl-6-methylene-tricyclo [6.2.1.0$^{1,5}$] undec-2-ylmethyl alcohol, are naturally occurring compounds. Both were in fact isolated from vetiver oil by means of an extremely complex and expensive process [see "The Flavour Industry" 1, 623 (1970) and Perfume & Essential Oil Records 60, 307 (1963)]. The said process essentially consists in submitting the essential oil to several fractional distillations and numerous separations effected by means of column chromatography. It has also to be pointed out that said compounds are relatively minor constituents of the said essential oil, this latter containing in fact a proportion of 0.1 to 0.5% (parts by weight) of each compound.

We have now found that pure 7,7-dimethyl-6-methylene-tricyclo[6.7.1.0$^{1,5}$] undecan-2-one possess a very distinct and powerful odour presenting an original woody character. Moreover, this latter is very stable and easily reproducible whereas the odour of the natural essential oil, which results from the over all effect of the odours of the individual constituents of the said oil, can vary depending on the origin and the purity of the said natural essential oil.

Owing to its particular olfactive properties the above mentioned tricyclic ketone can be widely used in the art of perfumery. Its use is broader than that of vetiver oil itself and it enables the perfumer to create totally original woody notes. Furthermore, the said ketone possesses a very appreciated reinforcing and fixative effect.

One of the processes of the invention consists in preparing the above mentioned tricyclic ketone by using a relatively cheap starting material. Said starting material is known in the art as vetivenic or zizanoic acid (7,7-dimethyl-6-methylene-tricyclo[6.2.1.0$^{1,5}$] undec-2-yl carboxylic acid). This compound may be obtained in large amounts and at a low price, as a by-product resulting from the purification of vetiver essential oil.

By means of a novel process of synthesis, industrially and economically more advantageous than the isolation of the said tricyclic ketone from the natural vetiver oil, it is now possible to place at the disposal of perfumers and flavourists a pure 7,7-dimethyl-6-methylene-tricyclo[6.2.1.0$^{1,5}$] undecan-2-one. The difficulties of supply, storage and purification of the natural essential oil are thus avoided.

7,7-dimethyl-6-methylene-tricyclo[6.2.1.0$^{1,5}$] undec-2-ylmethyl alcohol may be easily obtained from zizanoic acid, by reducing this latter compound by means of an alkali metal aluminiumhydride.

The discovery of the interesting organoleptic properties of 7,7-dimethyl-6-methylene-tricyclo[6.2.1.0$^{1,5}$] undecan-2-one in particular has thus encouraged the man in the art to further explore a whole series of analogous tricyclic derivatives which represent a new class of valuable perfuming and flavouring ingredients.

PREFERRED EMBODIMENTS OF THE INVENTION

In the definition of the above mentioned formulae the terms "lower alkyl group" and "alkyl group" are here defined to mean a branched or linear alkyl group containing from 1 to 6 carbon atoms, as e.g. a methyl, ethyl, n-propyl, isopropyl, n-butyl, isobutyl or ter-butyl group. The term "acyl group" is one in which the alkyl portion of the acyl group is here defined to mean a branched or linear alkyl group containing from 1 to 3 carbon atoms.

We have found that compounds of formula I possess interesting organoleptic properties and represent very useful ingredients for the preparation of perfumes or perfumed products as well as for the reconstruction of essential oils. We have equally found that the said compounds are particularly appreciated in the preparation of various artificial flavours and for flavouring foodstuffs, animal feeds, beverages, pharmaceutical preparations and tobacco products.

In the art of perfumery, the tricyclic compounds of formula I can improve, enhance or modify various olfactive notes, e.g. woody-amber-like or balsamic notes. By the use of the compounds of formula I it is thus possible to create various perfume compositions possessing an original, sometimes totally unexpected, woody character reminiscent in some instances of the odour of certain exotic woods such as cedarwood, sandalwood, olibanum or rose wood, for example, or even that of amber, myhrr, ylang or patchouli, for example. It was furthermore noticed that the thus improved or modified woody notes were, in most cases, particularly tenacious. The use of the above compounds is therefore very much appreciated in fine perfumery as well as for the manufacture of perfumed products as e.g. soaps, detergents, waxes, household materials or cosmetic preparations.

When the compounds of formula I are used as perfuming ingredients in perfume compositions, interesting effects are achieved by the use of proportions comprised between about 1 and about 5% of the total weight of the perfume composition. Depending upon the desired effect or upon the nature of the other constituents of a given composition, concentrations as low as 0.01% or as high as from about 10 to 20% (parts by weight), can be used. When the said compounds are used as reinforcing ingredients in perfumed bases, the concentrations used can be as high as about 80% of the total weight of the same base.

The compounds of formula I are also appreciated in the flavour industry. Depending upon the nature of the products in which they are incorporated, the said compounds can improve, enhance or modify various gustative notes such as woody, slightly earthy or balsamic notes, sometimes reminiscent of those of fresh berries. They are particularly appreciated for the preparation of artificial flavours of walnuts, hazelnuts, peanuts or those of citrus fruits like e.g. lemon or lime, or even those of bilberries or cranberries.

Owing to their specific organoleptic properties, the said compounds can also be used for flavouring tobacco and tobacco products. For exemple, they can improve various woody or amber-like notes reminiscent in some instances of the taste of certain oriental tobaccos.

Depending upon the nature of the flavoured material or upon the desired effect, the proportions used can vary within wide limits, being of the order of 1 ppm to 1% of the total weight of the flavoured material.

Interesting effects can be achieved by the use of proportions comprised between about 50 and about 100 ppm of the total weight of the flavoured product.

When the said compounds are used as ingredients for the preparation of artificial flavours, they can be used in proportions comprised between about 0.1 and about 15 of the total weight of the said flavouring composition, the proportions preferably used being of the order of 1 to 10%.

Among the compounds of formula I which can be used according to the present invention, the following are new compounds: 7,7-dimethyl-6-methylene-tricyclo[6.2.1.0$^{1,5}$] undec-2-yl acetate, 7,7-dimethyl-6-methylene-tricyclo[6.2.1.0$^{1,5}$] undec-2-yl methyl ketone, 6,7,7-trimethyl-tricyclo[6.2.1.0$^{1,5}$] undec-2-ylmethyl acetate, 6,7,7-trimethyl-tricyclo[6.2.1.0$^{1,5}$] undec-5-en-2-one, 6,7,7-trimethyl-tricyclo[6.2.1.0$^{1,5}$] undec-5-en-2-ol, 6,7,7-trimethyl-tricyclo[6.2.1.0$^{1,5}$] undec-5-en-2-yl acetate, 6,7,7-trimethyl-tricyclo[6.2.1.0$^{1,5}$] undec-5-en-2-ylmethyl ketone and 6,7,7- trimethyl-tricyclo[6.2.1.0$^{1,5}$] undec-5-en-2-ylmethyl acetate.

Several tricyclic compounds of formula I were already described in the scientific literature. Their description is given herein below:

(a) 7,7-dimethyl-6-methylene-tricyclo[6.2.1.0$^{1,5}$] undecan-2-one: isolated from vetiver oil according to the method given in "The Flavour Industry" 1, 623 (1970).
M.p. 77°-79° C. $[\alpha]_D^{20}$ = -117.4° (c=9.5 in CHCl$_3$)
IR (CCl$_4$): 3100, 1740, 1645, 1465, 1410, 1385, 1255, 1220, 1170, 1150, 1010, 980, 900 cm$^{-1}$
NMR (CCl$_4$): 1.10 (6H,s); 4.64 and 4.81 (2H, 2 broad s) δ ppm
MS: M$^+$ = 204; m/e = 189, 161, 133, 108;

(b) 6,7,7-trimethyl-tricyclo[6.2.1.0$^{1,5}$] undecan-2-one: prepared by catalytic hydrogenation (palladium 10% on charcoal) of the unsaturated ketone described under letter a.
$[\alpha]_D^{20}$ = -137.3° (c=3.4% in CHCl$_3$)
IR (neat): 1740, 1460 cm$^{-1}$
NMR (CCl$_4$): 0.82 (3H,s); 0.88 (3H,s); 0.84 (3H, d, J=5 cps) δ ppm
MS: M$^+$ = 206; m/e=151, 150, 41;

(c) 7,7-dimethyl-6-methylene-tricyclo[6.2.1.0$^{1,5}$] undecan-2-ol: prepared by reducing the corresponding ketone (see letter a) by means of lithium aluminiumhydride, according to the method described in "The Flavour Industry " 1, 623 (1970).
M.p. 57° C. $[\alpha]_D^{20}$ = +15.5° (c=0.8% in CHCl$_3$) IR (CCl$_4$): 3630, 3360, 3090, 1638, 1380, 1360, 1097, 1067, 890, 860 cm$^{-1}$
NMR (CCl$_4$): 1.07 (6H,s); 3.10 (1H,s); 4.02 (1H, t, J=5.5 cps); 4.53 (1H,s); 4.78 (1H,s) δ ppm
MS: M$^+$ = 206, m/e = 136, 135, 119, 91;

(d) 6,7,7-trimethyl-tricyclo[6.2.1.0$^{1,5}$] undecan-2-ol: prepared from 6,7,7-trimethyl-tricyclo[6.2.1.0$^{1,5}$] undec-2-ylmethyl ketone, according to a method described in Perfume & Essential Oil Records 60, 307 (1969).
M.p. 135° C. $[\alpha]_D^{22}$ = +40.4° (c=8.9% CHCl$_3$) IR (CCl$_4$): 3620, 1460, 1380, 1370, 1050, 950 cm$^{-1}$
NMR (CCl$_4$/DMSO-d$_6$): 0.76 (3H,d undefinite signal); 0.78 (3H,s); 0.82 (3H,s); 3.63 (1H, d, J=5 cps); 3.65 (1H,s) δ ppm
MS: M$^+$ = 208; m/e = 190, 147, 44, 41;

(e) 6,7,7-trimethyl-tricyclo[6.2.1.0$^{1,5}$] undec-2-yl acetate: prepared by oxidizing 6,7,7-trimethyl-tricyclo[6.2.1.0$^{1,5}$] undec-2-ylmethyl ketone by means of m-chloroperbenzoic acid, according to the Bayer-Villiger method (see reference cited under letter d).
M.p. 76°-77° C. $[\alpha]_D^{22}$ = +18.6° (c=1.9 in CHCl$_3$)
IR (CCl$_4$): 1735, 1460, 1375, 1245, 1025 cm$^{-1}$
NMR (CCl$_4$): 0.81 (3H, indefinite signal); 0.82 (3H,s); 0.85 (3H,s); 1.93 (3H,s); 4.86 (1H, d, J=5 cps) δ ppm
MS: m/e = 190, 147, 120, 119, 43;

(f) 6,7,7-trimethyl-tricyclo[6.2.1.0$^{1,5}$] undec-2-ylmethyl ketone: prepared by the treatment of 6,7,7-trimethyl-tricyclo[6.2.1.0$^{1,5}$] undec-2-yl carboxylic acid with methyllithium (see reference cited under letter d).
$[\alpha]_D^{20}$ = +101.2° (c=4.2% in CHCl$_3$)
IR (neat): 1705, 1455, 1355, 1165 cm$^{-1}$
NMR (CCl$_4$): 0.75 (3H,s); 0.80 (3H,d indefinite signal);
0.83 (3H,s); 2.05 (3H,s); 2.60-2.90 (1H,m) δ ppm MS: M$^+$ = 234; m/e = 163, 72, 43;

(g) methyl 7,7-dimethyl-6-methylene-tricyclo[6.2.1.0$^{1,5}$]undecan-2-oate: prepared from the corresponding acid, according to the method described in Tetrahedron Letters 1967, 2815.
$[\alpha]_D^{22}$ = +54.5° (c=1.8% in CHCl$_3$)
IR (neat): 3100, 1735, 1640, 1460, 1350, 1165, 890 cm$^{-1}$
NMR (CCl$_4$): 1.05 (3H,s); 1.06 (3H,s); 2.58 (2H,m); 3.56 (3H, s); 4.60 (1H, large s); 4.75 (1H, broad s) δ ppm
MS: M$^+$ = 248; m/e = 183, 145, 119, 41

(h) methyl 6,7,7-trimethyl-tricyclo[6.2.1.0$^{1,5}$] undec-5-en-2-oate: prepared by treating the ester described under letter g by means of formic acid (see reference cited under letter d).
M.p. 46°-48° C. $[\alpha]_D^{20}$ = +50.5° (c=2.8% in CHCl$_3$)
IR (KBr): 1730, 1430, 1350, 1200-1150, 1038, 980, 863, 725 cm$^{-1}$
NMR (CCl$_4$/CDCl$_3$): 0.99 (6H,s); 1.47 (3H,s); 2.31 (2H,t,J=6.5 cps); 2.70 (1H, d of d, J$_1$=6 cps, J$_2$=4.5 cps); 3.57 (3H,s)δ ppm
MS: M$^+$ = 248; m/e = 248, 233, 145, 119;

(i) 7,7-dimethyl-6-methylene-tricyclo[6.2.1.0$^{1,5}$] undec-2-ylmethyl alcohol: isolated from vetiver oil or prepared by reducing vetivenic acid by means of LiAlH$_4$ (see literature cited under letter d).
$[\alpha]_D^{20}$ = +35.9° (c=2% in CHCl$_3$)
IR (neat): 3350, 3100, 1635, 1465, 1380, 1362, 1025, 890 cm$^{-1}$
NMR (CCl$_4$): 1.06 (6H,s); 3.53 (2H,m); 4.57 et 4.71 (2 × 1H, broad s); 4.96 (1H,s)δ ppm
MS: M$^+$ = 220; m/e = 119, 91, 44, 41;

(j) 6,7,7-trimethyl-tricyclo[6.2.1.0$^{1,5}$] undec-2-ylmethyl alcohol: prepared by catalytic hydrogenation of the corresponding unsaturated alcohol (see letter i), in the presence of PtO$_2$ (see reference cited under letter d).
B.p. 120°-125° C./0.3 Torr n$_D^{20}$ = 1.5074
$[\alpha]_D^{22}$ = +33.4° (c=4.1% in CHCl$_3$);

(k) 6,7,7-trimethyl-tricyclo[6.2.1.0$^{1,5}$] undec-5-en-2-ylmethyl alcohol: prepared by the reduction of the corresponding ester (see letter f) with LiAlH$_4$.
M.p. 75°-76° C. $[\alpha]_D^{20}$ = +39.7° (c=1.2% in CHCl$_3$)
IR (KBr): 3270, 1455, 1380, 1370, 1358, 1084, 1073, 1030 cm$^{-1}$
NMR (CCl$_4$): 0.98 and 0.99 (6H, 2s); 1.42 (3H,s); 2.72 (1H,s); 3.40 (2H,m) δ ppm MS: M+ = 220; m/e = 205, 189, 159, 133; and (l) methyl 6,7,7-trimethyl-tricyclo[6.2.1.0$^{1,5}$]undecan-2-oate: prepared by catalytic hydrogenation (palladium 10% on charcoal) of the corresponding unsaturated ester (see letter g), according to the method described in Tetrahedron Letters 1967, 2815.

$[\alpha]_D^{23}$ = +70.4° (c=2.2% in CHCl$_3$)

IR (neat): 1735, 1460, 1355, 1195, 1180, 1160 cm$^{-1}$

NMR (CCl$_4$): 0.78 (3H,s); 0.78 (3H, d, J=5 cps); 0.85 (3H,s); 2.50 (1H,m); 3.58 (3H,s) δ ppm MS: M+ = 250; m/e = 190, 55, 41.

As indicated above, the tricyclic compounds of formula III may be prepared by isomerizing the exocyclic double bond of compounds of formula II.

The isomerization of the said exocyclic double bond may be effected by means of an acidic or a basic isomerizing agent, or even by heating (see Synthesis 1970, 405). Mineral or organic acids such as e.g. hydrochloric, sulfuric, p-toluenesulfonic, trifluoroacetic or formic acid may be conveniently used. Mixtures of both mineral and organic acids such as e.g. a mixture of hydrochloric or sulfuric acid and acetic acid may also be used. Formic acid is the preferred isomerizing agent. The said isomerization can also be achieved by means of a Lewis acid, boron trifluoride for example, or by heating the starting material in the presence of aluminium oxide.

Thus 6,7,7-trimethyl-tricyclo[6.2.1.0$^{1,5}$] undec-5-en-2-one may be easily obtained from 7,7-dimethyl-6-methylenetricyclo[6.2.1.0$^{1,5}$] undecan-2-one, by heating this latter compound at 40° C. in the presence of formic acid. According to the same procedure, 7,7-dimethyl-6-methylene-tricyclo[6.2.1.0$^{1,5}$] undec-2-yl carboxylic acid (vetivenic acid) was converted into 6,7,7-trimethyl-tricyclo[6.2.1.0$^{1,5}$]undec-5-en-2-yl carboxylic acid, which is a novel compound.

Another subject matter of the present invention is to provide a process for preparing the compound of formula

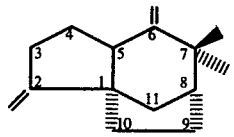

III wherein the symbols X taken together represent an oxygen atom.

According to one of the embodiments of the invention, the said process comprises decarboxylating under oxidative conditions the corresponding tricyclic carboxylic acid of formula III, reducing or hydrolyzing the obtained ester and finally oxidizing the thus obtained alcohol in order to afford the desired keto compound. The said decarboxylation, more precisely an oxidative decarboxylation, may be effected in accordance with the usual techniques, namely by means of lead tetracetate [see J. Amer. Chem. Soc. 83, 927 (1961)].

The obtained ester may be converted into the corresponding alcohol derivative according to the usual techniques, either by means of a hydrolysis in an acidic or a basic medium or by reducing the said ester by means of an alkali metal hydride such as e.g. lithium or sodium hydride or an alkali metal aluminium hydride. The subsequent oxidation may be achieved by means of the reagents generally used in order to convert a secondary alcohol into the corresponding ketone. Oxygenated derivatives of a transition metal such as e.g. chromium, nickel or manganese, in the presence of a mineral acid such as e.g. sulfuric or phosphoric acid or in the presence of a base such as pyridine, may be conveniently used. Chromium trioxide or an alkali metal chromate, in the presence of sulfuric acid, is preferably used.

According to another embodiment of the present invention, the above mentioned tricyclic ketone may also be obtained by reducing the said tricyclic carboxylic acid, i.e. vetivenic acid, by means of a reagent able to convert this latter compound into a compound of formula

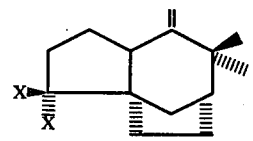

III wherein one of the symbols X represents a CH$_2$OH group and the other is a hydrogen atom, acylating the said hydroxyderivative, pyrolizing the obtained ester to afford a diolefinic compound of formula

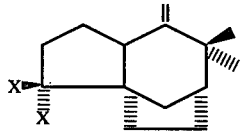

which is finally oxidized to the desired ketone.

The reduction of vetivenic acid can be effected by means of an alkali metal aluminiumhydride, namely LiAlH$_4$, according to the known techniques. The pyrolysis of the obtained ester may be carried out at a temperature comprised between about 400° and about 550° C., in accordance with the usual techniques. However, the better yields of tricyclic olefin have been obtained when the said pyrolysis was carried out at the proximity of the upper limit of the given temperature range.

The conversion of the thus obtained tricyclic diolefin may be achieved by splitting the exocyclic double bond in position 2 by means of the reagents commonly used in that field. Suitable methods are ozonolysis [see L. F. Fieser & M. Fieser, "Reagents for Organic Chemistry", Vol. I, p. 773, John Wiley & Sons, New York 1967] or oxidation by means of an alkali metal metaperiodate in the presence of catalytic amounts of osmium tetroxide [see op.cit. p. 812].

Finally the compounds of formula I which possess a cyclic double bond can be used as starting materials for the preparation of compounds having a saturated bicyclic skeleton. The said starting materials can be reduced according to the usual techniques. For example, catalytic hydrogenation of 7,7-dimethyl-6-methylene-tricyclo[6.2.1.0$^{1,5}$]undec-2-ylmethyl alcohol yields 6,7,7-trimethyl-tricyclo[6.2.1.0$^{1,5}$]undec-2-ylmethyl alcohol. Moreover the compounds of formula I wherein the symbols X taken together represent an oxygen atom can be converted into the corresponding hydroxy-derivatives. By esterifying the thus obtained alcohols, it is also possible to obtain the corresponding esters, e.g. the formates, acetates, propionates or butyrates.

The invention is illustrated in a more detailed manner by the following examples wherein the temperatures are given in degrees centigrade.

EXAMPLE 1

7,7-Dimethyl-6-methylene-tricyclo[6.2.1.0$^{1,5}$]undecan-2-one

Method A (a) 7,7-dimethyl-6-methylene-tricyclo[6.2.1.0$^{1,5}$]undec-2-yl acetate: a mixture of 4.68 g (20 mMole) of 7,7-dimethyl-6-methylenetricyclo[6.2.1.0$^{1,5}$]undec-2-yl carboxylic acid (vetivenic acid) and 16.4 g of anhydrous sodium acetate dissolved in 45 ml of acetic acid was heated to 75°. A single portion of 12.0 g of lead tetracetate was then added to the reaction mixture. An evolution of $CO_2$ started immediately. The reaction mixture was kept at 75° for 60 min., then cooled, diluted with 300 ml of water and finally extracted with 6 portions of 200 ml of n-pentane. After the usual treatments of washing and drying, the organic extracts were evaporated to afford 4.61 g (92%) of crude material containing 80% of the desired acetate (vapour phase chromatography analysis on CARBOWAX 20 M/250°). This material was used without any further purification for the following step. A pure sample was obtained after purification by means of column chromatographyf (silicagel 0.05–0.2 m - hexane/ethyl acetate 93:2).

$[\alpha]_D^{20} = +16.3°$ (c=1.2% in $CHCl_3$)

IR ($CCl_4$): 3085, 1730, 1633, 1240, 1030, 890 cm$^{-1}$

NMR ($CCl_4$): 1.07 (3H,s); 1.10 (3H,s); 1.96 (3H,s) 2.70 (1H,m); 4.60 (1H, broad s); 4.78 (1H, broad s); 4.95 (1H, d, J=5 cps) δ ppm MS: m/e = 188 (100), 173 (80), 145 (93), 43 (71).

(b) 7,7-dimethyl-6-methylene-tricyclo[6.2.1.0$^{1,5}$]undecan-2-ol: a solution of 9.7 g (39 mMole) of the acetate prepared under letter a (purity 80%) in 50 ml of anhydrous ether was added dropwise to a suspension of 1.85 g (48 mMole) of $LiAlH_4$ in 100 ml of anhydrous ether. The reaction mixture was then heated with an equal portion of water and finally extracted, washed and dried according to the usual techniques. There were thus obtained 8.4 g of a crude material containing 8.0% of the desired alcohol (vapour phase chromatography analysis on CARBOWAX 20 M/250°)

$[\alpha]_D^{20}$ 32 +39.3° (c=0.7% in $CHCl_3$)

(c) oxidation of 7,7-dimethyl-6-methylene-tricyclo[6.2.1.0$^{1,5}$]undecan-2-ol: a solution of chromic acid was first prepared as indicated below: a solution of 100 g (330 mMole) of $Na_2Cr_2O_7$ $2H_2O$ in 300 ml of water was added to 136 ml of concentrated sulfuric acid and finally diluted with water to 500 ml.

52 g of the above solution were then added dropwise, under vigourous stirring, to a cold (0°) solution of 5.2 g of the alcohol prepared under letter b in 120 ml of ether. After 15 min. of stirring, the reaction mixture was poured onto crushed ice, extracted with ether, the organic layer being successively washed with a 10% aqueous solution of $NaHCO_3$ and a saturated solution of NaCl. After the usual treatments of drying and evaporation, there were obtained 3.8 g of a crude material containing 80% of the desired ketone.

Pure 7,7-dimethyl-6-methylene-tricyclo[6.2.1.0$^{1,5}$]undecan-2-one was obtained after column chromatography (silicagel 0.05–0.2 mm - hexane/ethyl acetate 90:10). The thus obtained compound was identical with a pure sample prepared according to a known method.

Method B (a) 7,7-dimethyl-6-methylene-tricyclo[6.2.1.0$^{1,5}$]undec-2-ylmethyl alcohol: 5.0 g (21 mMole) of vetivenic acid dissolved in 25 ml of anhydrous ether were reduced by means of 1.6 g of $LiAlH_4$, in accordance with the procedure described sub letter b, method A. There were thus obtained 4.6 g of a colourless oil which contained 95% of the desired alcohol.

(b) 7,7-dimethyl-6-methylene-tricyclo[6.2.1.0$^{1,5}$]undec-2-ylmethyl acetate: 5.2 g (24 mMole) of the alcohol prepared under letter a were treated overnight at 20° with 100 ml of a 1:1 mixture of acetic anhydride and pyridine. After evaporation of the volatile fractions under reduced pressure, the obtained residue was diluted with 200 ml of ether. The organic layer was then successively washed with 2N HCl, 10% $NaHCO_3$ in water and finally dried over magnesium sulfate. After evaporation to dryness and fractional distillation of the obtained residue (0.01 Torr), there were obtained 5.68 g (92%) of the desired ester.

$[\alpha]_D^{20} = +32.8°$ (c=4.6% in $CHCl_3$)

IR (neat): 3095, 1740, 1638, 1460, 1378, 1240, 1035, 890 cm$^{-1}$

NMR ($CCl_4$): 1.03 and 1.05 (6H,2s); 1.93 (3H,s); 3.90 (2H,m); 4.48 (1H,s); 4.63 (1H,s) δ ppm MS: m/e = 261, 202, 187, 159, 43.

(c) 7,7-dimethyl-2,6-dimethylene-tricyclo[6.2.1.0$^{1,5}$]undecane: 19.5 g (74 mMole) of the ester prepared under letter b dissolved in 10 ml of n-pentane were pyrolized by passing the solution through a tube heated at 540° and filled with quartz fragments. The collected material was then diluted in 200 ml of ether, washed with a 2N $Na_2CO_3$ solution and finally distilled under reduced pressure (0.01 Torr), 13.8 g (92%) of the desired diolefin were then obtained.

$[\alpha]_D^{20} = -34.4°$ (c=1% in $CHCl_3$)

IR (neat): 3095, 3085, 1645, 1635, 1460, 1378, 1360, 890 cm$^{-1}$

NMR ($CCl_4$): 1.07 (6H,s) 4.53 (1H, broad s); 4.70 (1H,m) δ ppm

MS: M$^+$ = 202; m/e = 132, 131, 91.

(d) oxidation of 7,7-dimethyl-2,6-dimethylene-tricyclo[6.2.1.0$^{1,5}$]undecane with $OsO_4/NaIO_4$: 5.0 g (25 mMole) of the compound prepared under letter c dissolved in 200 ml of dioxan were added to a solution of 980 mg (3.9 mMole) of osmium tetroxide in 20 ml of dioxan. After 30 min. of stirring, 150 ml of a 50% aqueous solution of acetic acid were added to the reaction mixture, this latter having been stirred for a further period of 30 min. After the addition of a concentrated aqueous solution of 15.9 g (74 mMole) of sodium periodate, the reaction mixture was kept under stirring at room temperature during 5 hours. After having been diluted with 500 ml of water, the organic layer was extracted with ether. The etheral solution was then washed with an aqueous solution of $NaHCO_3$, dried and evaporated according to the usual techniques. The thus obtained crude material was finally purified by a column chromatography (silicagel-n-pentane/ethyl acetate) to afford 1.6 g (32%) of the derived tricyclic ketone.

The physical date of the thus obtained compound were identical with those of a pure sample prepared according to a known method.

(e) ozonolysis of 7,7-dimethyl-2,6-dimethylene[6.2.1.0$^{1,5}$]undecane: a stream of ozone was passed through a cooled (−78°) methanolic solution of 5.0 g (25 mMole) of the diolefinic compound prepared under letter c until the starting material has disappeared. After the addition of ozone, the reaction mixture was heated to room temperature, diluted with water and finally heated to reflux for 3 hours. After addition of 10 g of NaHSO$_3$ and extraction with ether in accordance with the usual techniques, there were obtained 4.7 g of a crude material containing 50% of the desired ketone (vapour phase chromatography analysis: CARBOWAX 20 l M/220°).

The pure compound was obtained in a 30% yield after purification according to the method described under letter d.

7,7-Dimethyl-6-methylene-tricyclo[6.2.1.0$^{1,5}$]undec-2-yl carboxylic acid (vetivenic acid) used as starting material in the above process (methods A and B) may be used as directly available on the market (minimum purity: 90%) or after having been purified as indicated hereafter:

50.0 g of crude vetivenic acid ("Bonga I" - commercialized by K. von Ahlefeldt, Angola) dissolved in 250 ml of acetone were added to 25 g cyclohexylamine. The thus obtained solid material was then submitted to 3 successive cristallizations in a 10:1 mixture of acetone and methanol and finally hydrolized by means of 2N hydrochloric acid. There were thus obtained 41.5 g (83%) of pure vetivenic acid.

M.p. 76°–78° $[\alpha]_D^{20}$ = +25.9° (c=1.5% in CHCl$_3$).
IR (CCl$_4$): 3100, 2800-2400, 1700, 1640, 1462, 1420, 1380, 1365, 1230, 895 cm$^{-1}$
NMR (CCl$_4$): 1.08 and 1.11 (6H,2s); 4.66 (1H,m); 4.82 (1H,m); 11,03 (1H,s) δ ppm
MS: M$^+$ = 234; m/e = 219, 164, 119.

EXAMPLE 2

6,7,7-Trimethyl-tricyclo[6.2.1.0$^{1,5}$]undec-5-en-2-one:

350 mg of 7,7-dimethyl-6-methylene-tricyclo[6.2.1.0$^{1,5}$]undecan-2-one (see example 1) were heated at 40° for 5 days in the presence of 20 ml of 98% formic acid. After the usual treatments of extraction, washing, drying and evaporation, there were isolated 330 mg of crude material (purity 90%). The pure compound was obtained after cristallization in n-pentane.

M.p. 35°–36° $[\alpha]_D^{20}$ = −211,7° (c=1.5% in CHCl$_3$)
IR (KBr): 1740, 1450, 1405, 1383, 1360, 1310, 1195, 1170, 1008, 978 cm$^{-1}$
NMR (CCl$_4$): 1.01 (6H,s); 1.52 (3H,s); 1.9–2.7 (4H,m) δ ppm
MS: M$^+$ = 204; m/e = 189, 161, 133, 119

EXAMPLE 3

6,7,7-Trimethyl-tricyclo[6.2.1.0$^{1,5}$]undec-5-en-2-yl carboxylic acid 500 mg of vetivenic acid (see example 1) were treated with formic acid under the same conditions as those described in example 2. The pure compound was obtained after cristallization in a 1:1 mixture of ethanol and water.

M.p. 77°–78° $[E]_D^{20}$ = +26.4° (c=1.5% in CHCl$_3$)
IR (KBr): 2800–2400, 1700, 1450, 1380, 1230, 930 cm$^{-1}$
NMR (CDCl$_3$): 1.00 (5H,s); 1.47 (3H,s); 2.72 (1H,m); 11.75 (1H,s) δ ppm
MS : M$^+$ = 234; m/e = 219, 191, 145.

The same process was then applied, under analogous conditions (one night at 20°), to the conversion of 7,7-dimethyl-6-methylene-tricyclo[6.2.1.0$^{1,5}$]undec-2-ylmethyl alcohol and 7,7-dimethyl-6-methylene-tricyclo[6.2.1.0$^{1,5}$]undec-2-ylmethyl acetate respectively.

(a) 6,7,7-trimethyl-tricyclo[6.2.1.0$^{1,5}$]undec-5-en-ylmethyl alcohol: and thus prepared compound was identical with a pure sample obtained according to a known method.

(b) 6,7,7-trimethyl-tricyclo[6.2.1.0$^{1,5}$]undec-5-en-2-ylmethyl acetate:
$[\alpha]_D^{22}$ = +46.5° (c=1,5% in CHCl$_3$)
IR : 1740, 1455, 1383, 1362, 1240, 1030 cm$^{-1}$
NMR (CCl$_4$) : 0.96 (3H,s); 0.99 (3H,s); 1.43 (3H,s); 1.93 (3H,s); 3.84 (2H,m) δ ppm
MS : M$^+$ = 262; m/e = 202, 187, 159, 43.

EXAMPLE 4

A base composition for a fine perfume was prepared by admixing the following ingredients (parts by weight):

| | |
|---|---|
| Decanal 10%* | 10 |
| Undecenal 10%* | 40 |
| Dodecanal 10% | 10 |
| Methyl-nonylacetaldehyde 10%* | 10 |
| Angelica roots oil 10%* | 10 |
| Castoreum 10%* | 20 |
| Natural degreased civet 10%* | 10 |
| Galbanum oil | 10 |
| Absolute jasmin | 50 |
| Olibanum oil | 10 |
| Patchouli | 80 |
| α-Phenylethyl acetate | 15 |
| α-Isomethylionone | 95 |
| Coriander oil | 5 |
| Hydroxycitronellol | 65 |
| Cyclopentadecanolide 10%* | 50 |
| Synthetic jasmine | 100 |
| Synthetic bergamot | 100 |
| Synthetic lemon | 40 |
| Absolute oak moss 50%* | 30 |
| Oriental sandal wood oil | 30 |
| Synthetic neroli | 20 |
| Muscone 10%* | 50 |
| Coumarin | 50 |
| Musk ambrette | 10 |
| Musk ketone | 30 |
| Diethyl phthalate | 50 |
| Total | 1000 |

*in diethyl phthalate.

By adding to 95 g of the above base composition 5 g of 7,7-dimethyl-6-methylene-tricyclo[6.2.1.0$^{1,5}$]undecan-2-one, there was obtained a new perfume composition possessing an original and very harmonious woody character.

The addition in the same proportions of the corresponding saturated tricyclic ketone conferred to the above base a distinct and agreable woody note.

EXAMPLE 5

A base perfume composition of the Chypre type was prepared by admixing the following ingredients (parts by weight):

| | |
|---|---|
| α-Phenylethyl acetate | 30 |
| Undecenal 10%* | 100 |
| α-Methylundecenal 10%* | 20 |
| Coumarin | 60 |
| Vanillin | 5 |
| Musk ketone | 55 |
| Cyclopentadecanone 10%* | 30 |
| α-Isomethylionone | 60 |
| Absolute oak moss | 20 |
| Absolute labdanum | 10 |
| Synthetic galbanum | 10 |
| Synthetic castoreum | 20 |
| Methyl 2-pentyl-3-oxo-cyclopentyl-acetate | 50 |
| Benzyl acetate | 100 |
| Indol 10%* | 10 |
| Hexylcinnamic aldehyde | 50 |
| Synthetic rose | 50 |
| Patchouli | 20 |
| Synthetic bergamot | 200 |
| Total | 900 |

*in diethyl phthalate

By adding to 90 g of the above composition 10 g of a 10% solution of 7,7-dimethyl-6-methylene-tricyclo[6.2.1.0$^{1,5}$] undecan-2-one in diethyl phthalate, there was obtained a new perfume composition possessing a very elegant and original woody character, having moreover a very natural richness.

By adding in the same proportions 6,7,7-trimethyl-tricyclo[6.2.1.0$^{1,5}$]undec-5-en-2-one or 6,7,7-trimethyl-tricyclo [6.2.1.0$^{1,5}$]undecan-2-one to the above base, there was obtained a perfume composition possessing a very rich woody and amberlike note.

The addition in the same proportions of either 6,7,7-trimethyl-tricyclo[6.2.1.0$^{1,5}$]undec-2-ylmethyl ketone or 7,7-dimethyl-6-methylene-tricyclo[6.2.1.0$^{1,5}$]undec-2-ylmethyl acetate conferred to the above base a novel and particularly agreable woody and slightly balsamic note reminiscent of that of cedar wood.

EXAMPLE 6

A base perfume composition for a masculine Eau de Cologne was prepared by admixing the following ingredients (parts by weight):

| | |
|---|---|
| Sage oil | 20 |
| Lavender oil | 150 |
| Synthetic bergamot | 200 |
| Lemon oil | 140 |
| Sweet orange oil | 40 |
| Synthetic galbanum 10%* | 20 |
| Muscone 10%* | 50 |
| Methyl 2-pentyl-3-oxo-cyclopentyl-acetate | 10 |
| 1,1-Dimethyl-6-ter-butyl-4-acetylindane | 10 |
| α-Isomethylionone | 50 |
| Synthetic ylang | 80 |
| Synthetic jasmine | 25 |
| Synthetic geranium | 50 |
| Synthetic neroli | 100 |
| Coriander oil | 5 |
| Total | 950 |

*in diethyl phthalate

By adding to 95 g of the above base composition 5 g of a 10% solution of 7,7-dimethyl-6-methylene-tricyclo [6.2.1.0$^{1,5}$]undecan-2-one in diethyl phthalate, there was obtained a new perfume composition possessing a very elegant and original woody character, having moreover a very natural richness.

By adding in the same proportions 6,7,7-trimethyl-tricyclo[6.2.1.0$^{1,5}$]undec-5-en-2-one or 6,7,7-trimethyl-tricyclo [6.2.1.0$^{1,5}$]undecan-2-one to the above base, there was obtained a perfume composition possessing a very rich woody and amberlike note.

The addition in the same proportions of either 6,7,7-trimethyl-tricyclo[6.2.1.0$^{1,5}$]undec-2-ylmethyl ketone or 7,7-dimethyl-6-methylene-tricyclo[6.2.1.0$^{1,5}$]undec-2-ylmethyl acetate conferred to the above base a novel and particularly ag agreable woody and slightly balsamic note reminiscent of that of cedar wood.

EXAMPLE 7

A base flavouring composition of the Tutti-Frutti type was prepared by admixing the following ingredients (parts by weight):

| | |
|---|---|
| Vanillin | 25 |
| Allyl caproate | 10 |
| Citral | 15 |
| Amyl butyrate | 35 |
| Sweet orange oil | 50 |
| Ethyl butyrate | 75 |
| Ethyl acetate | 150 |
| Amyl acetate | 150 |
| Lemon oil | 250 |
| Orange terpenes | 240 |
| Total | 1000 |

Two flavouring compositions were then prepared as indicated below (parts by weight):

| Base composition | A (test) 100 | B (control) 100 |
|---|---|---|
| 6,7,7-Trimethyl-tricyclo [6.7.1.0$^{1,5}$]undecan-2-one | 10 | — |
| 95% Ethyl alcohol | 890 | 900 |
| Total | 1000 | 1000 |

Both mixtures A and B were then used for the preparation of the following foodstuffs, in the proportions of 100 g of flavouring composition per 100 kg of foodstuff. Ice-cream: An ice-cream mixture was prepared from 1 liter of milk, 5 egg yolks and 250 g of sugar in the following manner: the milk was heated, the sugar and the egg yolks were mixed and the hot milk was added to the mixture while stirring. Stirring was continued until the mass thickened, and the flavour was added. The mixture was then frozen in the usual manner. Pudding: A mixture of 60 g of sugar and 3 g of pectine was added to 500 ml of hot milk, while stirring. The mixture was brought to the boil for a few seconds, the flavour was added and the mixture allowed to cool.

The foodstuffs prepared as described above were then tasted by a panel of flavour experts who declared that the "test" foodstuffs possessed a more pronounced, well rounded and slightly woody fruity taste as compared with the "control" foodstuffs, reminiscent moreover of that of fresh bilberries or raspberries.

By replacing in the same proportions, the above ketone by 6,7,7-trimethyl-tricyclo[6.2.1.0$^{1,5}$]undec-5-en-2-one or 7,7-dimethyl-6-methylene-tricyclo[6.2.1.0$^{1,5}$]undec-2-ylmethyl acetate, a similar effect was observed.

EXAMPLE 8

A commercial cranberry jam was flavoured with a 10% ethanolic solution of 6,7,7-trimethyl-tricyclo[6.2.1.0$^{1,5}$] undecan-2-one in the proportions of 10 ml of said ethanolic solution per 100 kg of flavoured material. The thus flavoured foodstuff was then compared by a panel of flavour experts with an unflavoured jam containing ethyl alcohol in the above given proportions. It was declared that the flavoured jam possessed a woody, slightly balsamic taste reminiscent of that of fresh cranberries.

EXAMPLE 9

To 1 liter of an acidulous sugar syrup (prepared by diluting 650 g of sucrose and 10 ml of a 50% aqueous solution of citric acid in 1000 ml of water), flavoured with lemon oil in the proportion of 30 g of the said oil per 100 l of syrup, there was added 1 ml of a 1% ethanolic solution of 6,7,7-trimethyltricyclo[6.2.1.0$^{1,5}$]undecan-2-one. The thus flavoured beverage was then compared with an unflavoured syrup by a panel of flavour experts. These latter declared that the flavoured syrup as compared with the unflavoured one possessed an agreable and more marked fruity and woody taste, reminiscent of that of lime.

EXAMPLE 10

7 g of a 1% ethanolic solution of 6,7,7-trimethyltricyclo[6.2.1.0$^{1,5}$]undecam-2-one was sprayed onto 100 g of an "American blend" tobacco mixture. The tobacco thus flavoured was used for the manufacture of "test" cigarettes, the smoke of which was then subjected to organoleptic evaluation by comparison with unflavoured "control" cigarettes. The tobacco used to prepare the "control" cigarettes was preliminarily treated with a corresponding amount of ethyl alcohol.

A panel of flavour experts defined the taste of the smoke of the "test" cigarettes as being more rounded than that of the "control" cigarettes, the said smoke possessing moreover a more marked woody character.

After following the same flavouring procedure, the panel of experts declared that the smoke of the "test" cigarettes flavoured by either 6,7,7-trimethyl-tricyclo[6.7.1.0$^{1,5}$] undec-5-en-2-an, 7,7-dimethyl-6-methylene-tricyclo[6.2.1.0$^{1,5}$] undecan-2-one or 7,7-dimethyl-6-methylene-tricyclo[6.7.1.0$^{1,5}$] undec-2-ylmethyl acetate possessed a more intense woody taste reminiscent of that of cedar wood and, in some instances, of the taste of certain oriental tobaccos.

I claim:

1. A perfume composition which comprises an inert diluent or carrier and at least one of the tricyclic compounds of the formula

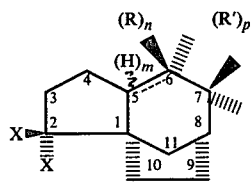   Ib containing a single or double bond in the position indicated by the dotted line at position 5 and wherein the indices $m$, $n$ and $p$ represent the integers zero or 1 and one of the symbols X represents a COO-alkyl group and the other represents a hydrogen atom, and wherein (i) the symbol R represents a lower alkyl group when both $m$ and $p$ are identical and equal to zero and $n$ is 1; or (ii) the symbol R represents a lower alkylidene group when $m$ and $n$ are identical and equal to 1 and $p$ is zero; or (iii) one of the symbols R and R' represents a lower alkyl group and the other is a hydrogen atom when each of the indices $m$, $n$ and $p$ is equal to 1.

2. A process for improving, enhancing or modifying the organoleptic properties of perfumes which comprises adding thereto a small but effective amount of at least one of the tricyclic compounds of formula

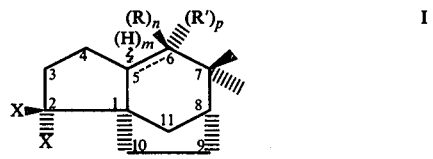   I containing a single or double bond in the position indicated by the dotted line at position 5 and wherein the indices $m$, $n$ and $p$ represent the integers zero or 1, and one of the symbols X represents a COO-alkyl group and the other represents a hydrogen atom, and wherein (i) the symbol R represents a lower alkyl group when both $m$ and $p$ are identical and equal to zero and $n$ is 1; or (ii) the symbol R represents a lower alkylidene group when $m$ and $n$ are indentical and equal to 1 and $p$ is zero; or (iii) one of the symbols R and R' represents a lower alkyl group and the other is a hydrogen atom when each of the indices $m$, $n$ and $p$ is equal to 1.

* * * * *